United States Patent
Thompson

[19]

[11] Patent Number: 5,823,553
[45] Date of Patent: Oct. 20, 1998

[54] RUNNING BOARD ACCESSORY WITH FLAP SEAL

[75] Inventor: Scott P. Thompson, Des Moines, Iowa

[73] Assignee: DFM Corporation, Indianola, Iowa

[21] Appl. No.: 846,439

[22] Filed: Apr. 30, 1997

Related U.S. Application Data

[63] Continuation-in-part of Ser. No. 651,962, May 21, 1996, Pat. No. 5,769,439.

[51] Int. Cl.⁶ ........................................................ B60R 3/00
[52] U.S. Cl. ........................................ 280/164.1; 280/163
[58] Field of Search ................................ 280/163, 164.1, 280/164.2, 166, 762, 770

[56] References Cited

U.S. PATENT DOCUMENTS

| D. 342,476 | 12/1993 | Beckett | D12/203 |
|---|---|---|---|
| 2,214,048 | 9/1940 | Edwards | 280/164.1 |
| 4,257,620 | 3/1981 | Okland | 280/164.1 |
| 4,836,568 | 6/1989 | Preslik et al. | 280/164.1 |
| 5,137,293 | 8/1992 | Graves et al. | 280/163 |
| 5,193,829 | 3/1993 | Holloway et al. | 280/163 |
| 5,238,268 | 8/1993 | Logan | 280/848 |
| 5,340,154 | 8/1994 | Scott | 280/848 |
| 5,501,475 | 3/1996 | Bundy | 280/166 |

*Primary Examiner*—Robert J. Oberleitner
*Assistant Examiner*—C. T. Bartz
*Attorney, Agent, or Firm*—Zarley, McKee, Thomte, Voorhees, Sease

[57] ABSTRACT

A vehicular body extension that includes an elongated running board and a flap seal disposed between the running board and a vehicle. The flap seal extends from and is hinged with the running board such that the flap seal is biased against the vehicle when installed.

The invention also includes a method of installing the vehicular body extension to a mounting surface of a vehicle wherein the flap seal is aligned with and biased against the mounting surface.

17 Claims, 10 Drawing Sheets

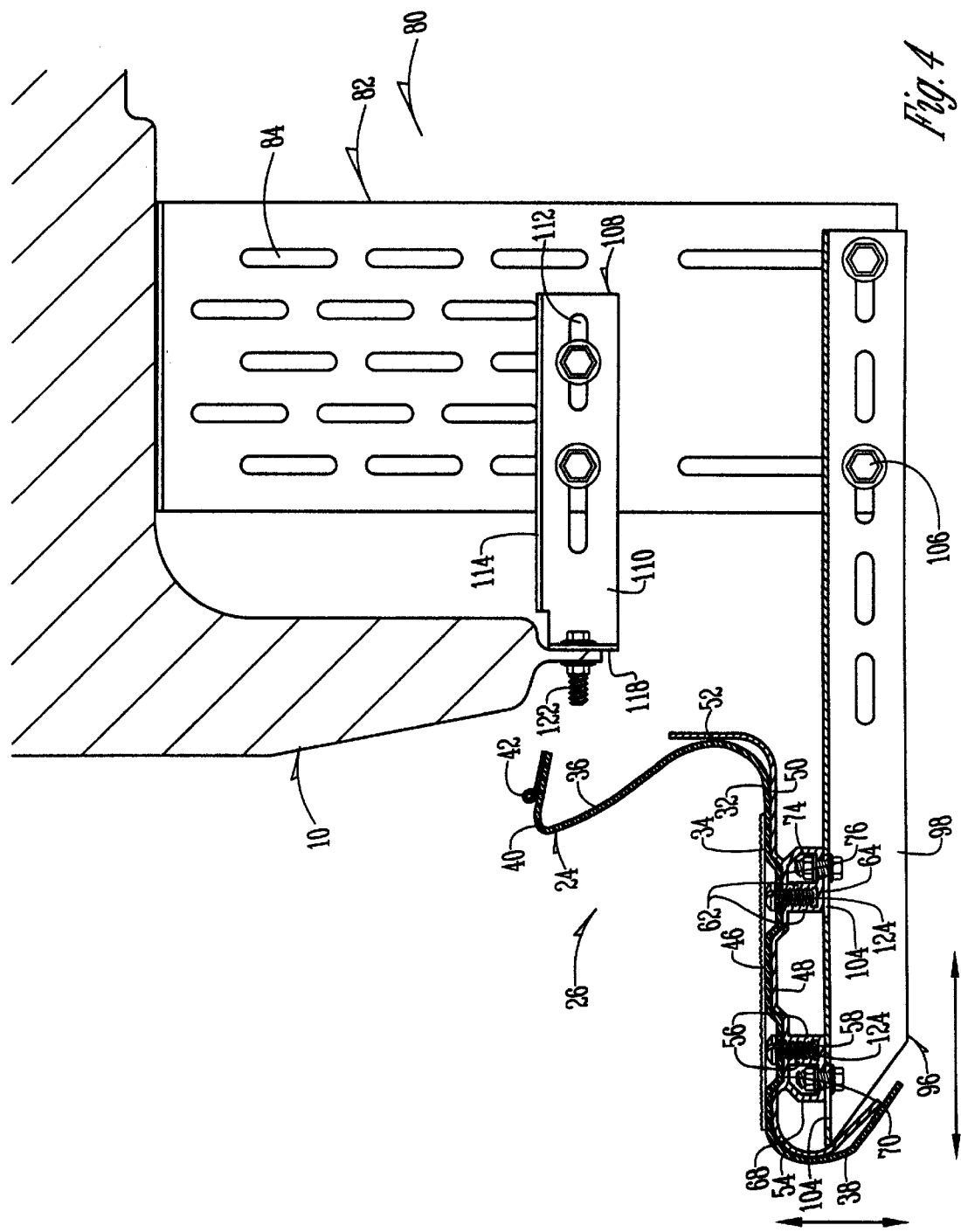

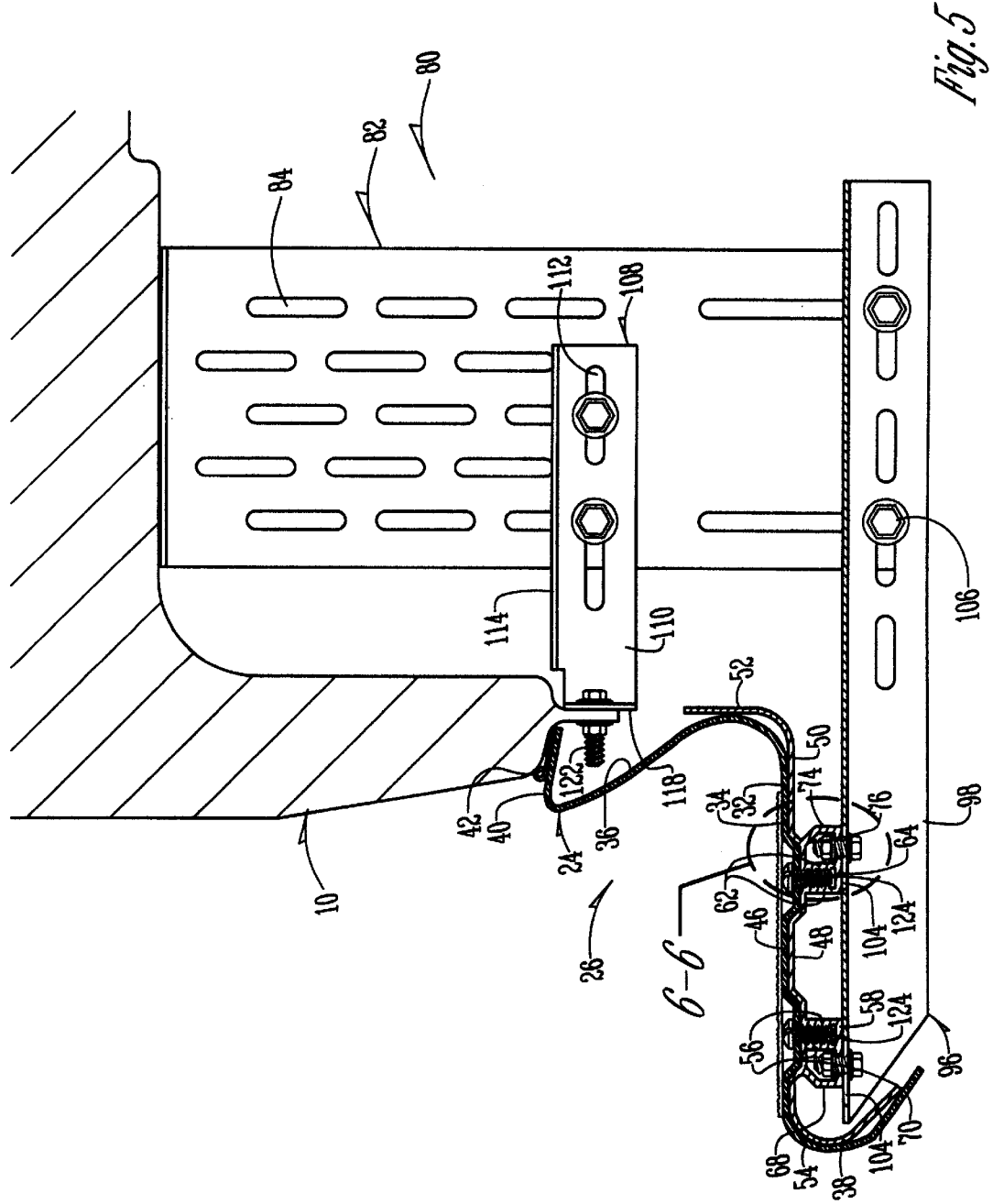

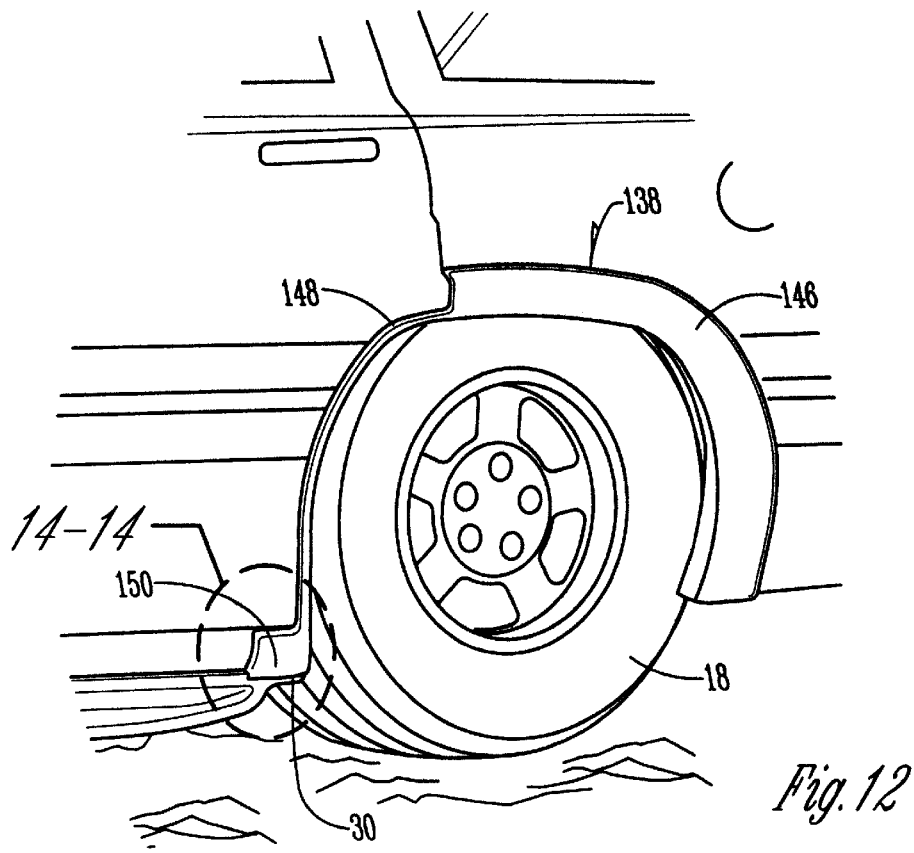
Fig. 12
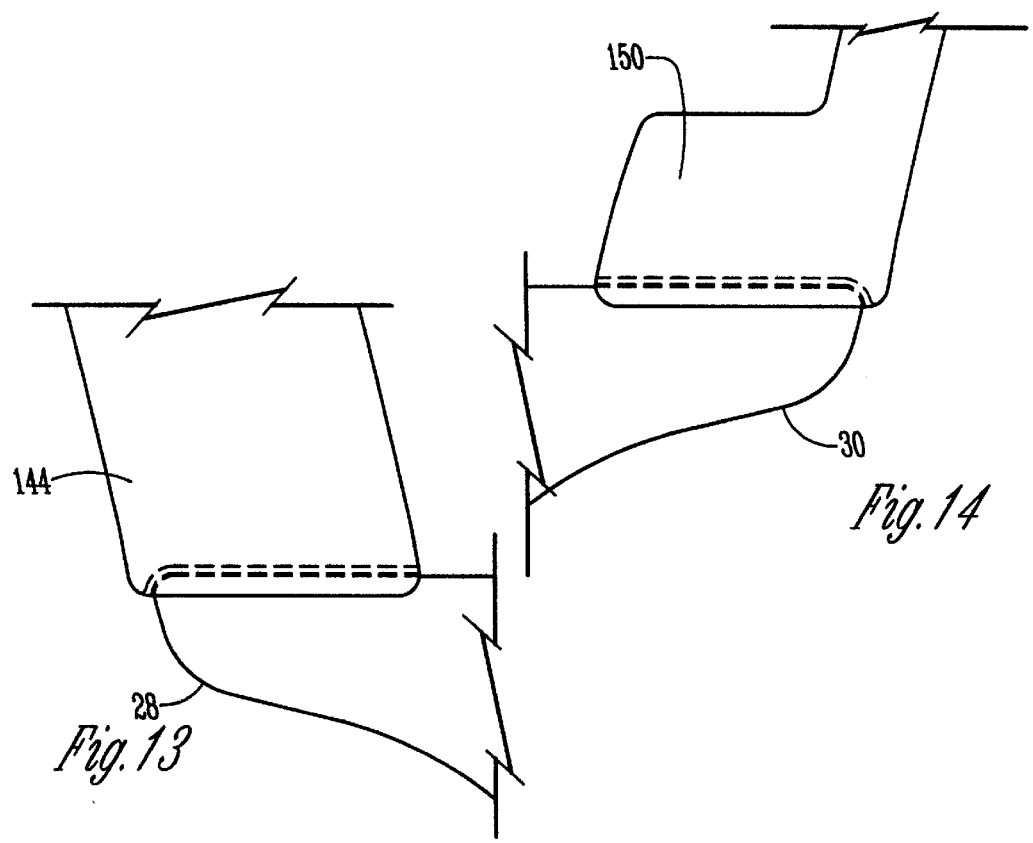
Fig. 13
Fig. 14

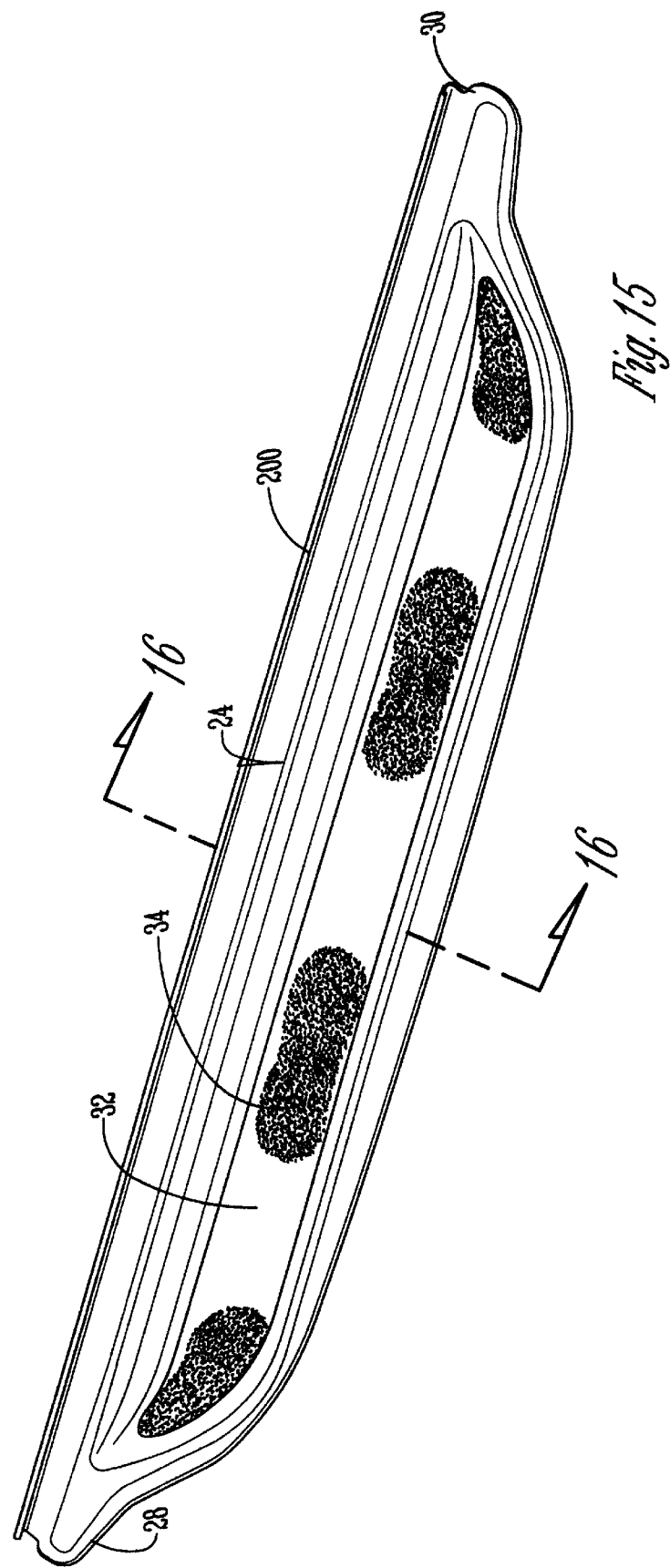

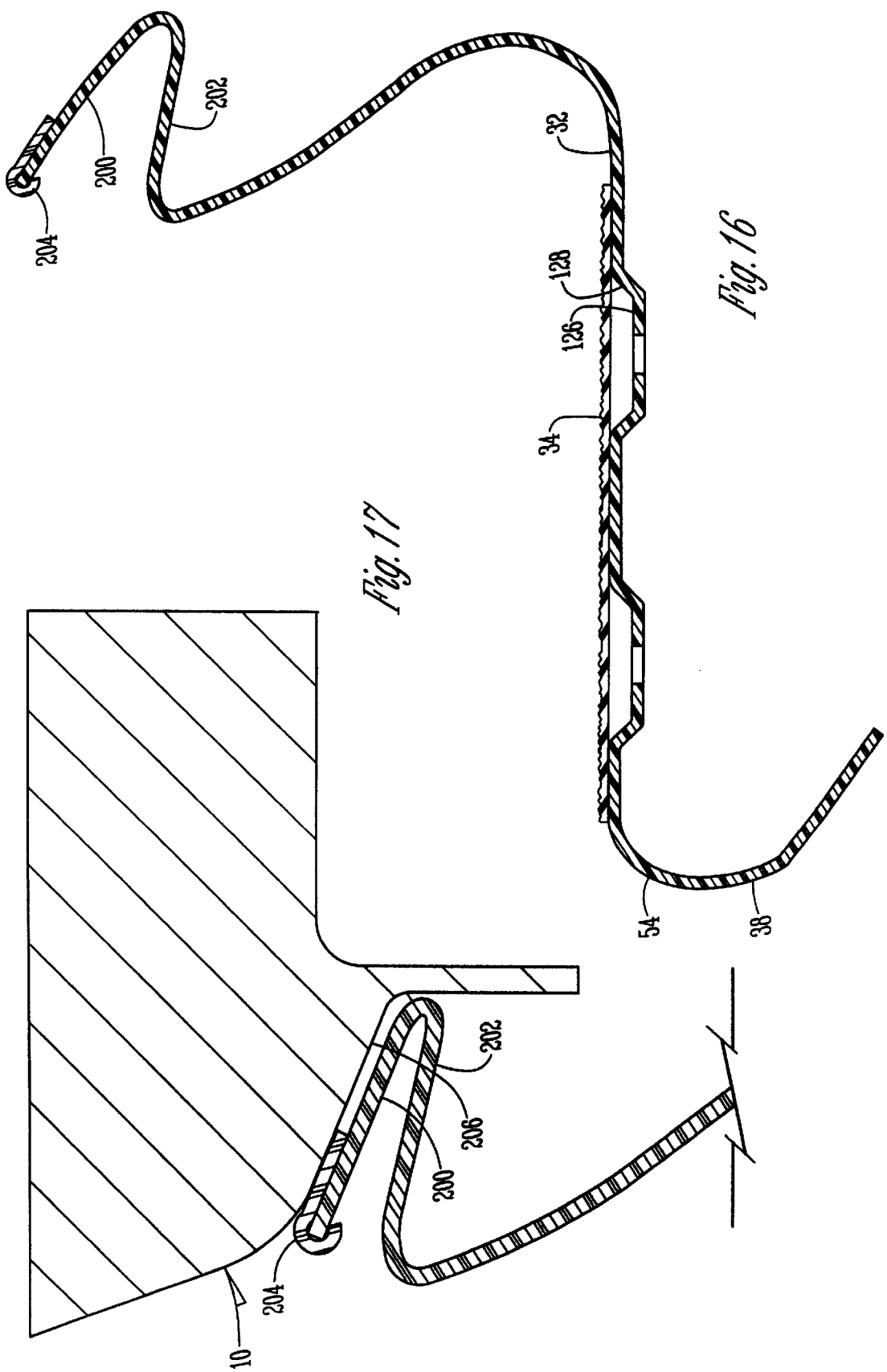

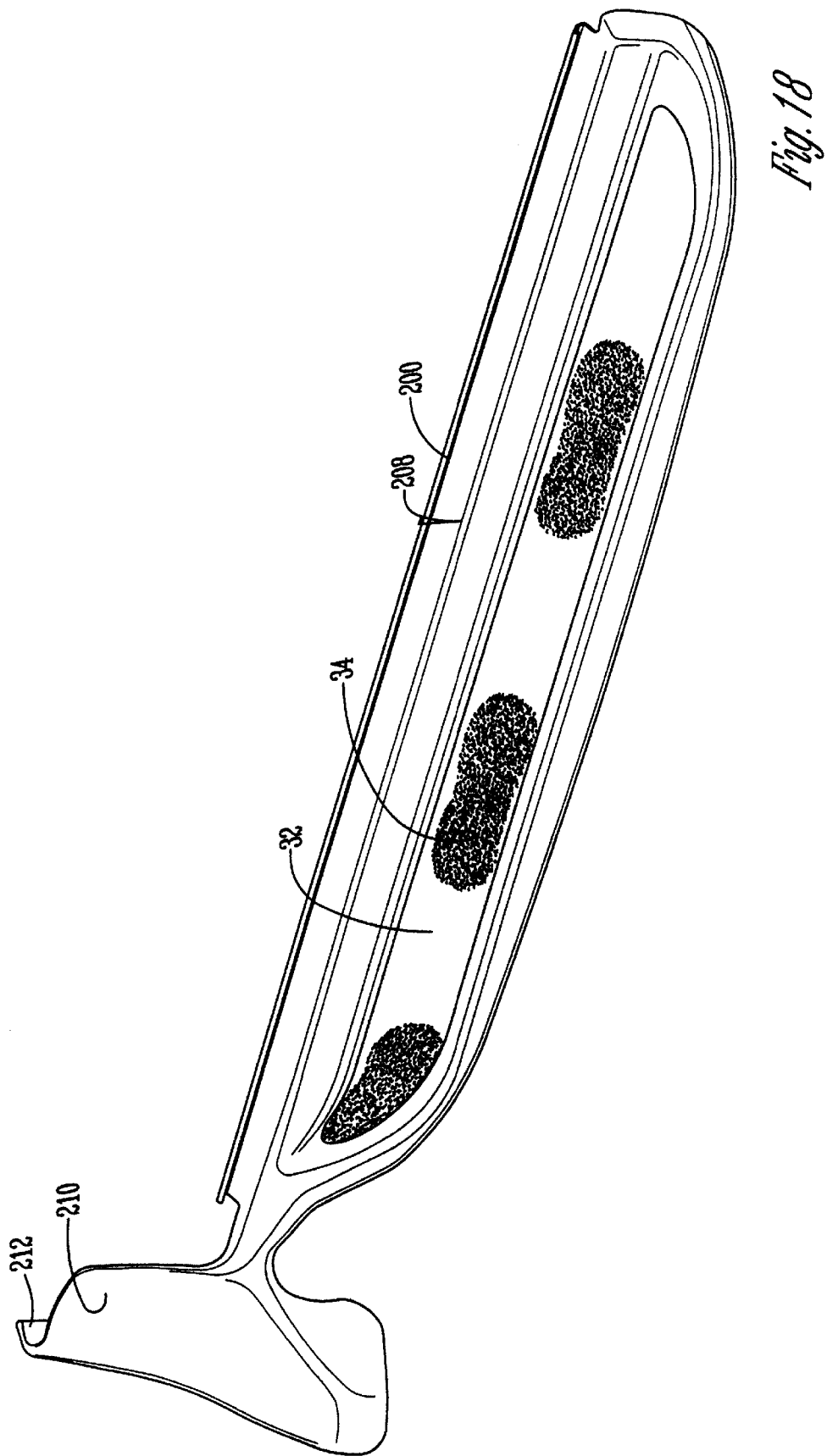

RUNNING BOARD ACCESSORY WITH FLAP SEAL

CROSS-REFERENCE TO A RELATED APPLICATION

Continuation-in-part of Ser. No. 08/651,962 filed May 21, 1996 entitled UNIVERSAL RUNNING BOARD ACCESSORY, PREFERABLY WITH FENDER ATTACHMENT, now U.S. Pat. No. 5,769,439; issued Jun. 23, 1998.

BACKGROUND OF THE INVENTION

This invention relates to accessories attachable to a vehicle and, in particular, it relates to a running board preferably attached to a fender flare or gravel guard.

Manufactures and users add running boards, fender flares and gravel guards to vehicles for both esthetic appeal and functionality. Running boards, fender flares, and gravel guards give a vehicle a "custom" look. They are also functional, however. A running board provides a support surface to allow drivers and passengers to easily enter and exit a vehicle, while fender flares and gravel guards protect the fender and fender well from materials such as gravel, mud and debris propelled by the tires of the vehicle.

Running boards are presently designed for use with either the driver side or passenger side of a vehicle, but not both. That is, prior art running boards are customized for use on only one side of a vehicle and are not easily adapted for use on the other. Thus, there is a need in the art for a running board that can easily mount to either the driver side or passenger side of the vehicle.

Because vehicles have many different types of body styles, mounting a running board to a specific vehicle is often problematic. The running boards and mounting devices presently used can be attached to a vehicle in only a finite number of positions. Many of the attachment devices include a plurality of slots and holes for adjustably mounting the running board to the vehicle body. With such a mounting device, however, there are inevitably "dead spaces" or gaps limiting the adjustment of the running board. For this reason, many different styles of running boards are required for attachment to the myriad of different body styles. Therefore, there is a need in the art for a running board that can be continuously adjusted over a range of positions to eliminate the need for multiple running board and assembly designs.

Because of the inherent limitations in body styles, there are often only a few places along the vehicle body for attaching a running board. The prior art solution is to provide multiple styles of running boards and attachments so that an appropriate running board can be selected for a given body style. Instead, it would be desirable to have a running board that can be adjustably mounted over a range of positions independent of the location of the mounting device. In other words, there is a need in the art for a mounting member attachable anywhere along the running board so to be easily adaptable to a variety of vehicle body styles.

The bottom of a vehicle body is seldom perfectly flat. As a result, the running board does not always fit squarely against the bottom of the vehicle. Light shines through any gaps between the running board and vehicle body, which detracts from the overall aesthetic appeal of the accessory. Accordingly, there is also a need in the art for a running board, and a method for installing the same, that mounts to a vehicle body in such a way as to eliminate any gaps therebetween.

Fender flares are generally known in the art. Fender flares are most often of one-piece construction being molded or formed of a durable material such as plastic. Although the flares are configured to blend with the contour of the fender surface surrounding the wheel well, they are not easily adapted for use with a running board. Prior art fenders rely upon glue, screws, rivets, or similar attachment means for securing the running board to the fender flare. This is undesirable for several reasons. Such attachment means are unsightly and detract from the esthetic quality of the accessories. Also, it is often difficult to easily and quickly locate the appropriate attachment position for the fender flare and running board. In addition, this prior art design does not give the appearance that the fender flare and running board are integrally formed, but instead the combination appears as two distinct pieces. For these reasons, there is also a need in the art for a running board and fender flare combination that allows the installer to easily locate the attachment point and also gives the appearance of an integrally formed accessory.

Gravel guards are also generally known in the art. In the past, however, they have not been easily integrated with running boards and fender flares. Consequently, there is also a need in the art for gravel guard accessory that is easily integrated with a running board and fender flare.

It is therefore the primary objective of the present invention to provide a running board, fender flare, and gravel guard that improves upon or solves the problems and deficiencies existing in the art.

Another objective of the present invention is to provide a running board and fender flare that are easily attachable to each other and adaptable for mounting to a variety of different vehicle body styles.

A further objective of the present invention is to provide a running board that can be mounted on either the driver side or passenger side of a vehicle.

Another objective of the present invention is to provide a running board assembly that is easily adjustable for mounting to different locations along the vehicle body.

A further objective of the present invention is to provide a running board assembly that is capable of providing continuous linear adjustment.

A further objective of the present invention is to provide a fender flare and running board that easily locate and nest together and appear integrally formed.

Another objective of the present invention is to provide a running board that mounts to a vehicle body in such a way as to eliminate any gaps therebetween.

A still further objective of the present invention is to provide a method for installing a running board on a vehicle that provides a tight seal between the running board and vehicle and eliminates any gaps therebetween.

A still further objective of the present invention is to provide a running board, fender flare, and gravel guard that are integrally formed.

Another objective of the present invention is to provide vehicle accessories which are efficient in operation, economical to manufacture, and durable in use.

SUMMARY OF THE INVENTION

The foregoing objectives are achieved in the preferred embodiment of the invention by a vehicular body extension that comprises an elongated running board and a flap seal disposed between the running board and the vehicle. The flap seal extends from and is hinged with the running board such that the flap seal is biased against the vehicle when the vehicular body extension is installed. As such, the flap seal eliminates any gaps between the running board and vehicle. In its preferred form, the running board and flap seal are integrally formed.

The present invention also includes a method of installing a vehicular body extension having an elongated running board and a flap seal as described above. The flap seal is aligned with the mounting surface of the vehicle, and the running board is then urged toward the mounting surface so that the flap seal becomes biased against the mounting surface. Finally, the vehicular body extension is secured to the vehicle. This method produces a tight seal between the running board and the vehicle and eliminates any gaps therebetween.

Another embodiment of the invention comprises the combination of a running board, fender flare and gravel guard. In its preferred form, these accessories are integrally formed.

BRIEF DESCRIPTION OF THE DRAWINGS

FIG. 4 is a sectional view taken along line 4—4 of FIG. 1.

FIG. 5 is a sectional view taken along line 5—5 of FIG. 1.

FIG. 12 is an enlarged perspective view of area 12—12 in FIG. 10 showing the nesting of the fender flare and running board about the rearward wheel and fender.

FIG. 13 is an enlarged side elevational view of area 13—13 in FIG. 11 showing with hidden lines the nesting of the forward fender flare and running board.

FIG. 14 is an enlarged side elevational view of area 14—14 in FIG. 2 showing with hidden lines the nesting of the rearward fender flare and running board.

FIG. 15 is a perspective view of a running board with a flap seal.

FIG. 16 is a sectional view taken along line 16—16 of FIG. 15.

FIG. 17 is a partial sectional through the vehicle and running board, showing the flap seal of the running board biased against the vehicle.

FIG. 18 is a perspective view of an integrally formed running board, fender flare and gravel guard.

DETAILED DESCRIPTION OF THE PREFERRED EMBODIMENT

Figure 1:
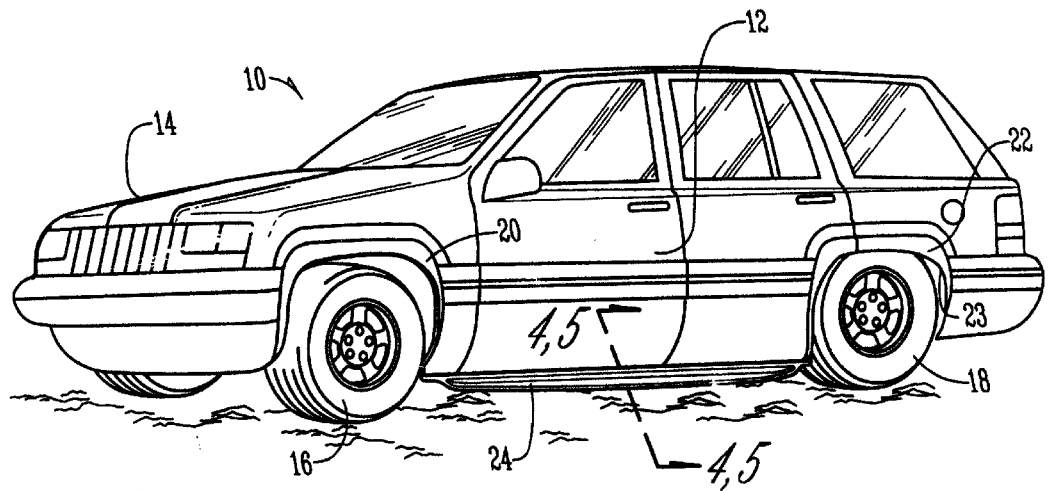
FIG. 1 is a perspective view of a preferred embodiment of the running board mounted on a vehicle.

FIG. 1 shows a vehicle 10 having a driver side 12, a passenger side 14, forward wheels 16 and rearward wheels 18. Fenders 20 and 22 partially surround the forward and rearward wheels 16 and 18 respectively. Running boards 24 are mounted towards the bottom of the driver side 12 and passenger side 14.

Figure 2:
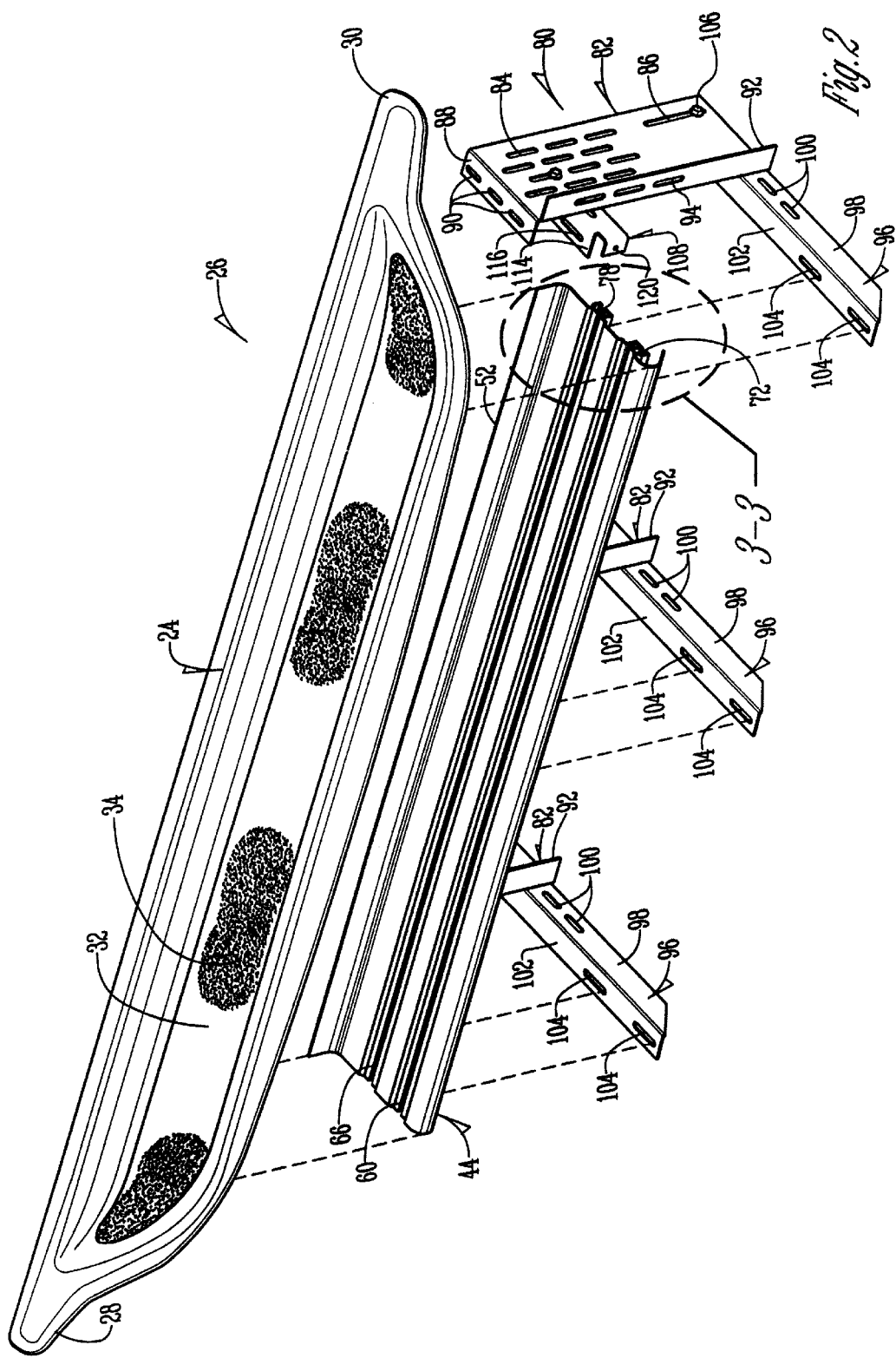
FIG. 2 is an exploded perspective view of the running board assembly.

FIG. 2 shows in more detail the components of the running board assembly 26. The running board 24 is preferably of a one-piece construction being molded or formed of a durable material such as plastic. The elongated running board 24 has a first end 28, a second end 30, and a substantially horizontal support platform 32 therebetween. The running board 24 is substantially symmetrical about its midpoint between the first and second ends (28, 30). As such, the running board 24 is "universal" and can be mounted to either the driver side 12 or passenger side 14 of the vehicle 10. Traction control areas 34 attach to the support platform 32 to prevent slippage during entry and exit from the vehicle.

FIG. 4 shows the curvature of the running board 24 in more detail. An upper arcuate portion 36 extends above the support platform 32 and a lower arcuate portion 38 extends below the support platform 32. A mating surface 40 extends beyond the upper arcuate portion 36 and a flexible sealant 42 positioned on top of the mating surface 40 abuts the vehicle 10 when the running board assembly 26 is fully installed.

Figure 3:
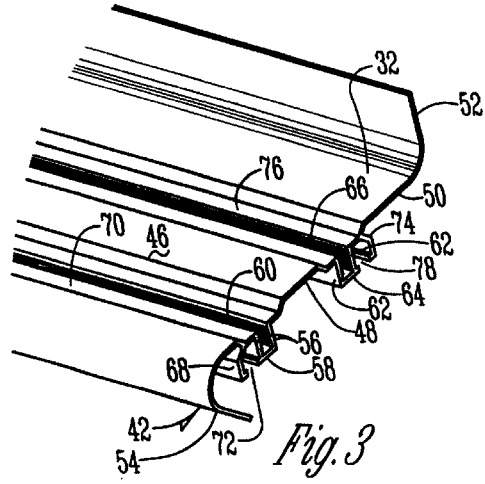
FIG. 3 is a partial perspective view of the reinforcement member.

The running board 24 mounts on top of a reinforcement member 44. The reinforcement member 44 provides support to the running board 24 and also serves as structure for mounting the running board 24 to the vehicle 10. The reinforcement member 44 is preferably made of a strong and light-weight material such as aluminum. As shown in FIG. 3, the reinforcement member 44 has an upper surface 46, a lower surface 48 and a substantially horizontal portion 50. Arcuate edges 52 and 54 follow the contour of the running board 24 to provide additional reinforcement and support. Sidewalls 56 and bottom wall 58 form a first upper channel 60 which is open at the upper surface 46. Similarly, side walls 62 and bottom wall 64 form a second upper channel 66. As will be more fully explained later, the first and second channels 60 and 66 receive fasteners for adjustably mounting the running board 24 on the reinforcement member 44. Because the first and second upper channels 60 and 66 span the entire length of the reinforcement member 44, the running board 24 can be attached at anywhere along its length.

Side walls 56 and 68 and top wall 70 form a first lower channel 72. Similarly, side walls 62 and 74 and top wall 76 form a second lower channel 78. The purpose of the first and second lower channels 72 and 78 is to receive fasteners for adjustably mounting the reinforcement member 44 onto a mounting device.

The reinforcement member 44 is adjustably mounted to the vehicle 10 using a mounting device 80 as shown in FIG. 2. The mounting device 80 has a first mounting member 82 with slots 84 and 86, an upper side edge 88 with slots 90, and a forward side edge 92 with slots 94. Upper side edge 88 and forward side edge 92 are available for receiving fasteners to attach the mounting device 80 to the vehicle 10.

A second mounting member 96 is adjustably attached to and extends substantially horizontal from the first mounting member 80. The second mounting member 96 has a side wall 98 with slots 100 and a top wall 102 with slots 104. Fasteners 106 secure the first and second mounting members 80 and 96 together in a desired position.

A common problem with mounting brackets is that there are gaps or "dead areas" inherent in using a plurality of attachment slots. Prior mounting brackets cannot be adjusted in these dead areas. In the present invention, however, slots 100, 104 and 86 are arranged such that the second mounting member 86 has continuous linear adjustment in a substantially horizontal direction. Slots 104 "cover" the gap between slots 100.

FIGS. 4 and 5 illustrate how the running board assembly 26 is easily adapted to fit a variety of body styles. Stringer bracket 108 can be attached at various points along the first mounting member 82. The stringer bracket 108 has a first side wall 110 with slots 112 and a second side wall 114 with slots 116 (see FIG. 2). Forward edge 118 of the stringer bracket 108 has a hole 120 for receiving a fastener 122 and attaching to the vehicle 10. The stringer bracket can be easily adjusted into a variety of different positions for mounting to a specific place on the vehicle 10 (see FIGS. 8 and 9).

Figure 6:
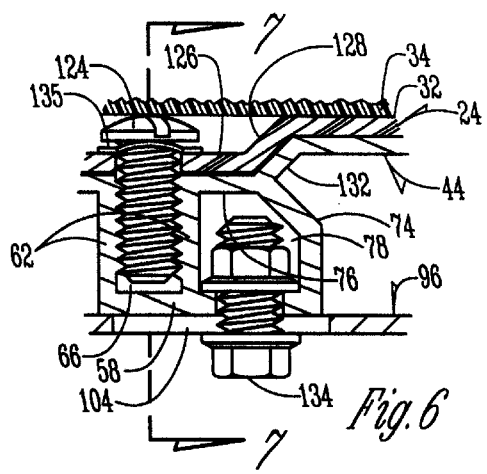
FIG. 6 is a sectional view taken along line 6—6 of FIG. 5.

FIG. 6 is a sectional view showing in more detail the attachment of the running board 24 to the reinforcement member 44 and additionally attachment of the reinforcement member 44 to the second mounting member 96. The second upper and lower channels 66 and 78 are described in detail with the first upper and lower channels 60 and 72 having similar construction. The second upper channel 66 is threaded to receive a screw 124 for adjustably mounting the running board 24 along the channel 66. The screw 124 is recessed at or below the support platform 32 by walls 126 and 128. The reinforcement member 44 is designed to accept the recessed portion of the running board 24 so that walls 126 and 128 abut walls 76 and 132 of the reinforcement member 44, respectively. The screw 124 can be easily adjusted along the second upper channel 66 to adjustably mount the running board 24 to the reinforcement member 44 at any position along the length of the running board 24. The second lower channel 78 is threaded to receive a fastener 134 for adjustably mounting the reinforcement member 44 on the second mounting member 96. Traction control areas enclose the recessed areas.

Figure 7:
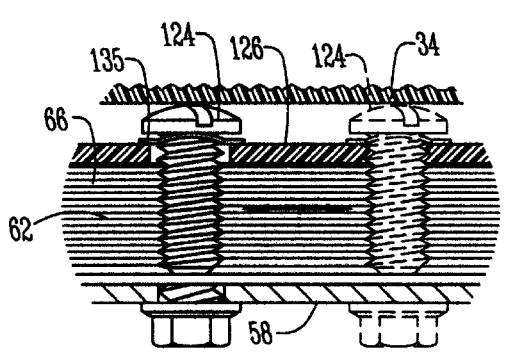
FIG. 7 is a sectional view taken along line 7—7 of FIG. 6 showing expansion and contraction of the running board.

As shown in FIG. 7, a spring washer 135 is used to secure the running board 24 along the first and second upper channels (60, 66). A plastic running board will not always remain fixed, but will expand and contract when subjected to high loads and changes in temperature. The spring washer 135 applies pressure to the running board 24 so that it remains secured while still allowing for slight contractions, expansions, and shifting. Without the spring washer 135, the surface of the running board 24 could crack or warp to relieve structural tension.

Figure 8:
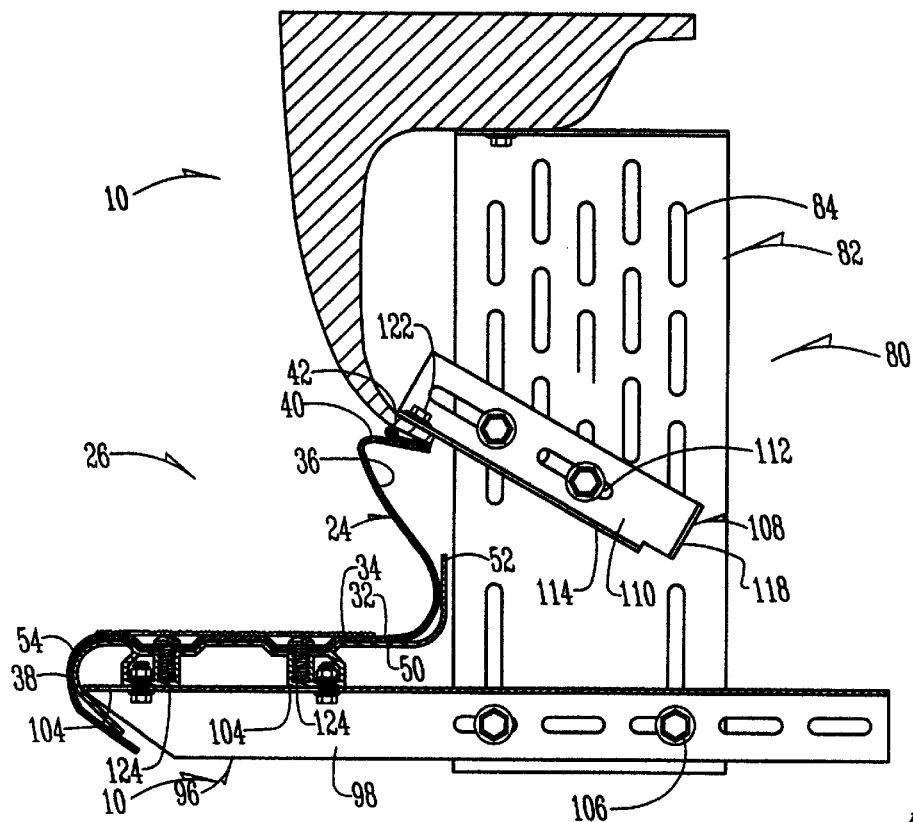
FIG. 8 is a sectional view taken along line 8—8 of FIG. 1 showing an alternative mounting position for the running board.
Figure 9:
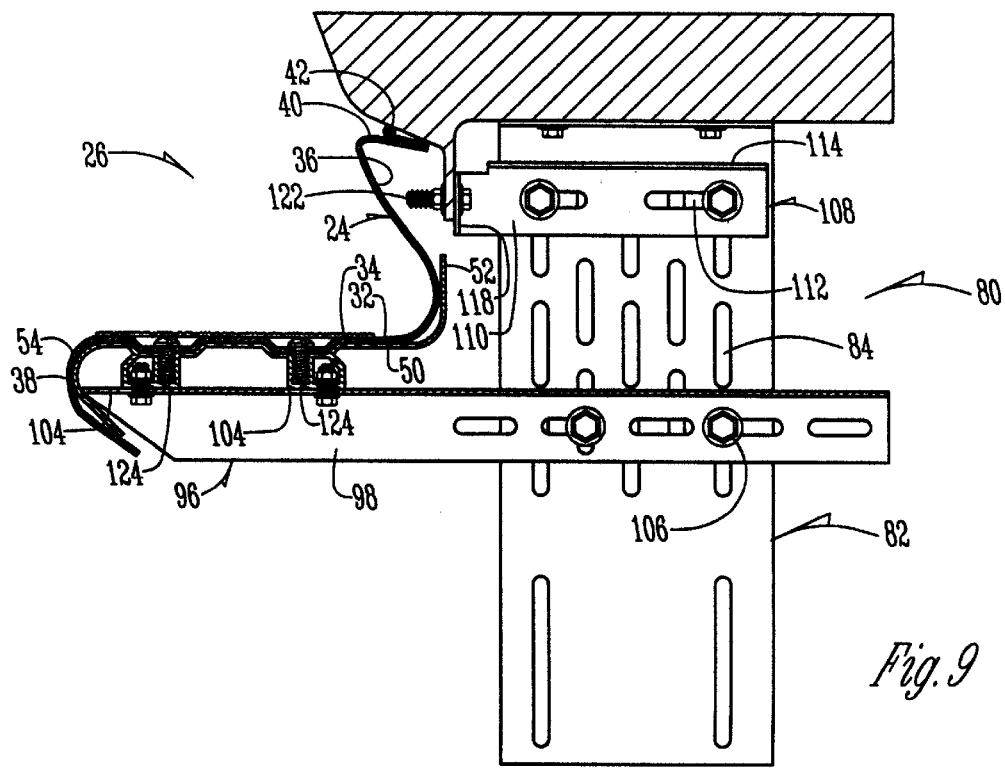
FIG. 9 is a sectional view taken along line 9—9 of FIG. 1 showing a still different mounting position for the running board.

FIGS. 8 and 9 further illustrate how the running board assembly can be easily attached to a variety of different body styles.

Figure 10:
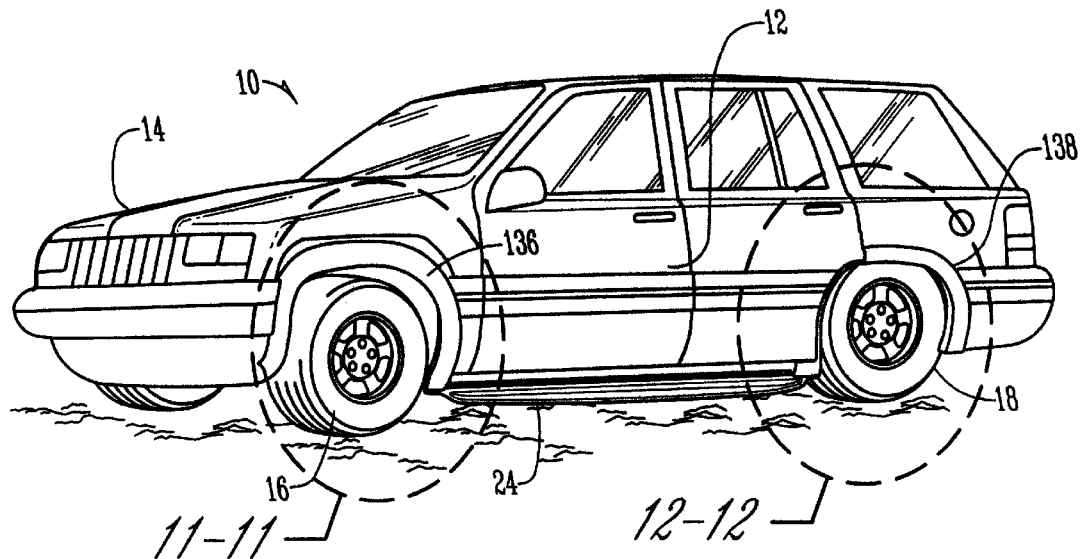
FIG. 10 is a perspective view of a preferred embodiment of the running board and fender flares mounted on a vehicle.
Figure 11:
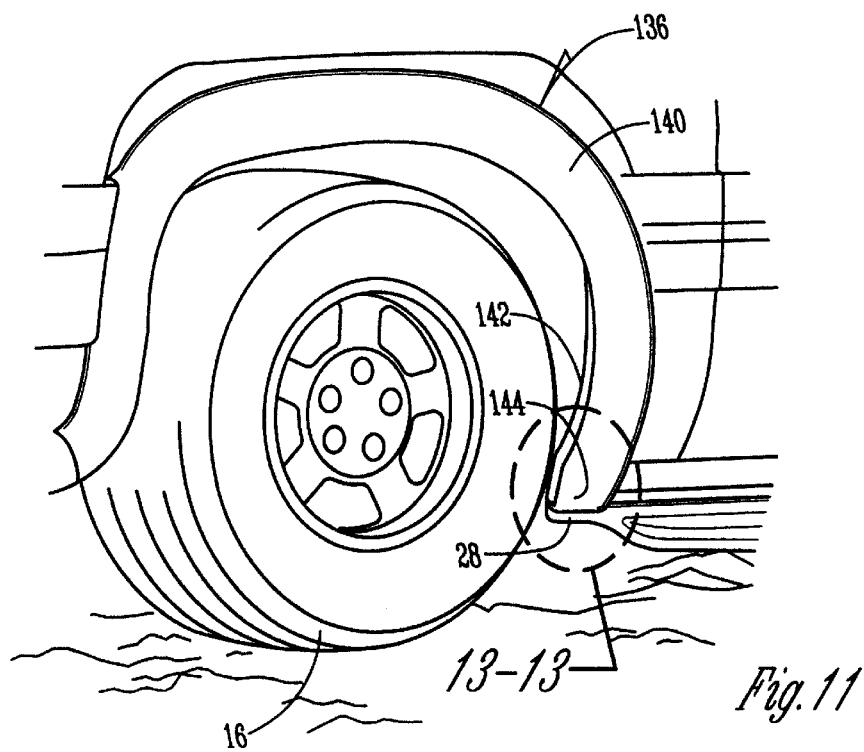
FIG. 11 is an enlarged perspective view of area 11—11 in FIGS. 10 showing the nesting of the fender flare and running board about the forward wheel and fender.

The running board 24 and running board assembly 26 are also intended to be used with forward and rearward fender flares 136 and 138 as shown in FIG. 10. FIG. 11 illustrates the nesting of the forward fender flare 136 and the running board 24. The forward fender flare 136 has a front panel 140 and a side panel 142. The first end 28 of the running board 24 and the lower end 144 of the fender flare 136 are contoured so as to nest together. That is, the lower end 144 of the forward fender flare 136 and the first end 28 of the running board 24 are contoured such that the attachment point is easily located. Furthermore, this nesting gives the appearance that the fender flare 136 and running board 24 are integrally formed, not two separate pieces. The forward fender flare 136 is attached to the forward fender 20 using adhesive or some other fastening means.

FIG. 13 more clearly illustrates with hidden lines how the inner surface of the lower end 144 of the fender flare 136 is contoured to nest with the outside surface of the first end 28 of the running board 24.

The rearward fender flare 138 is similarly constructed. The rearward fender flare 138 includes a rearward front wall 146, a forward front wall 148 and a forward side wall (not shown). The second end 30 of the running board 24 and the lower end 150 of the rearward fender flare 136 similarly mate and nest together. FIG. 14 shows with hidden lines how the inner surface of the lower end 150 of the rearward fender flare 138 is contoured with the outer surface of the second end 30 of the running board 24 to nest the two accessories together.

As shown in FIGS. 15 and 16, the running board 24 of the present invention can be modified to include a flap seal 200 for use in mounting the running board to the vehicle 10. The flap seal 200 extends from and is hinged with a substantially flat wall 202 of the running board 24. The flap seal 200 and wall 202 are hinged to produce a tension therebetween. Accordingly, when the running board 24 is mounted to the vehicle 10, the flap seal 200 is biased against the vehicle, thereby producing a tight seal and eliminating any gaps therebetween. It is preferred that the flap seal 200 and wall 202 be integrally formed. It is also preferred that a protective coating 204 be disposed between the flap seal 200 and the mounting surface of the vehicle 10, to protect against marring and scratching of the vehicle.

Running boards are generally mounted against the bottom side 206 of the vehicle. Hence, the flap seal 200 abuts and is biased against the bottom side 206, as shown in FIG. 17.

To install the running board 24 of FIG. 15, the flap seal 200 is first aligned with the bottom side 206 of the vehicle. Next, the running board 24 and wall 202 are urged towards the bottom side 206 such that the flap seal 200 becomes biased against the bottom side (see FIG. 17). Finally, the running board 24 is secured to the vehicle, in any conventional manner or as previously described, with the flap seal 200 biased against the vehicle 10.

FIG. 18 illustrates another embodiment of the invention, where an elongated running board 208 is combined with a fender flare 210 and a gravel guard 212. It is preferred that these components be integrally formed. The fender flare 210 at least partially encloses the fender 22 of the vehicle, and the gravel guard 212 extends from the fender flare to within the adjacent fender well 23. The embodiment of FIG. 18 may also be used with a flap seal 200 as previously described.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A vehicular body extension for attachment to a vehicle comprising:

an elongated running board having a first end, a second end, and a substantially flat wall between said first and second ends;

a flap seal disposed between said wall and said vehicle; and said flap seal extending from and being hinged with said wall and biased against said vehicle when said vehicular body extension is attached to said vehicle.

2. The vehicular body extension of claim 1 wherein said flap seal biased against said vehicle such that no gaps exist between said flap seal and said vehicle.

3. The vehicular body extension of claim 1 wherein said flap seal and said wall of said running board being integrally formed.

4. The vehicular body extension of claim 1 wherein said vehicle having a driver side and a passenger side and said running board having a midpoint between said first and second ends, said running board being substantially symmetrical about said midpoint so that said running board is attachable to either said driver side or said passenger side.

5. The vehicular body extension of claim 1 wherein a protective coating is disposed between said flap seal and said vehicle.

6. The vehicular body extension of claim 1 wherein said vehicle having a bottom surface and said flap seal butting against said bottom surface.

7. The vehicular body extension of claim 6 wherein said flap seal butting against said bottom surface such that no gaps exist between said flap seal and said bottom surface.

8. A method of installing a vehicular body extension to the mounting surface of a vehicle, said vehicular extension includes an elongated running board having a first end, a second end, and a substantially flat wall between said first and second ends, a flap seal disposed between said wall and said mounting surface, said flap seal extending from and being hinged to said wall and biased against said vehicle when said vehicular body extension attached to said vehicle, said method comprising:

aligning said flap seal with said mounting surface of said vehicle;

urging said wall toward said mounting surface such that said flap seal biased against said mounting surface; and securing said vehicular body extension to said vehicle.

9. The method of installing a vehicular body extension of claim 8 wherein said wall being urged toward said mounting surface to produce a tension between said wall and said flap seal to seal said flap seal to said mounting surface.

10. The method of installing a vehicular body extension of claim 8 wherein said flap seal being biased against said mounting surface such that no gaps exist between said flap seal and said mounting surface.

11. A vehicular body extension for attachment to a vehicle having, at least one fender and at least one fender well adjacent said fender, said vehicular body extension comprising:

an elongated running board having a first end, a second end, a substantially flat wall between said first and second ends, and a flap seal disposed between said wall and said vehicle, said flap seal extending from and being hinged to said wall and biased against said vehicle when said vehicular body extension is attached to said vehicle;

a fender flare attached to one of said first or second ends and at least partially enclosing said fender; and a gravel guard extending from said fender flare and within said fender wall.

12. The vehicular body extension of claim 11 wherein said running board, fender flare and gravel guard being integrally formed.

13. The vehicular body extension of claim 11 wherein said flap seal, running board, fender flare, and gravel guard being integrally formed.

14. The vehicular body extension of claim 11 wherein a protective coating is disposed between said flap seal and said vehicle.

15. The vehicular body extension of claim 11 wherein said vehicle having a bottom surface and said flap seal butting against said bottom surface.

16. The vehicular body extension of claim 15 wherein said flap seal butting against said bottom surface such that no gaps exist between said flap seal and said bottom surface.

17. The vehicular body extension of claim 11 wherein said flap seal biased against said vehicle such that no gaps exist between said flap seal and said vehicle.

* * * * *